March 24, 1942.   T. RÜTTEN   2,277,416
CHARGING DEVICE FOR STORAGE BUNKERS
Filed April 19, 1940   3 Sheets-Sheet 1

March 24, 1942. T. RÜTTEN 2,277,416
CHARGING DEVICE FOR STORAGE BUNKERS
Filed April 19, 1940   3 Sheets-Sheet 3

UNITED STATES PATENT OFFICE 2,277,416

CHARGING DEVICE FOR STORAGE BUNKERS

Theodor Rütten, Essen, Germany, assignor, by mesne assignments, to Koppers Company, Pittsburgh, Pa., a corporation of Delaware Application April 19, 1940, Serial No. 330,493
In Germany May 4, 1939

3 Claims. (Cl. 214—17)

The present invention relates to charging devices for storage bunkers for the delivery of lumpy or granular solid material by means of a conveyor which is arranged above the bunker to move the material in a radial direction and is also rotatable around a vertical axis.

In this specification and in the appended claims, the term "conveyor" is intended to include all suitable means for moving solid material at a comparatively low velocity from one point to another, and it comprises especially the so-called conveyor belt with or without separate boxes, the chain-type conveyor, the worm conveyor or the like.

Apparatus of the kind above referred to serves to distribute the material within the storage bunkers in a uniform and even manner without forming charging cones in order to obtain a complete and full utilization of the whole interior of the bunker space. When filling in the material, for instance coal, into the bunkers in this way, a segregation of the coal is rendered impossible. This is of special importance, for example, in the storage of coals which are to be used for carbonization in coke ovens. The charging devices for storage bunkers as known heretofore have, however, the disadvantage that they allow for the distribution of material within such bunkers as have substantially only a square cross section. For bunkers having a different cross section, more particularly bunkers of rectangular cross section, it would be necessary, when making use of the heretofore known distributing devices, to have several of these rotating conveyors which in turn require a separate material feeder for each rotary conveyor.

My present invention has for its object to provide for the aforesaid uniform distribution of the material within storage bunkers of great length by means of only a single distributing apparatus in a manner to avoid a segregation of the material. This aim is principally arrived at according to this invention by providing a distributing apparatus comprising a conveyor which rotates around a vertical axis, and is capable of moving the material radially, the distribution apparatus being also arranged to travel laterally of the vertical axis of rotation on tracks also placed above the bunker area to be filled. The uniform filling of the area with the material may take place, in one embodiment of the invention, in such a manner that during the uniform rotation and the likewise uniform radial movement of the material by the conveyor, the distributing apparatus may move gradually forward laterally of the vertical axis of rotation over the trackway therefor.

In order to accomplish this latter feature, it is however necessary that the feeding belt, which delivers the material to the conveyor of distributing apparatus be adapted to be moved laterally in the direction of the trackway together with the lateral movement of the distributing apparatus.

A further and preferred embodiment of the present invention consists in having the feeding means, belt, which delivers the material onto the conveyor that is to move the material radially from the axis of the distributing apparatus, reach from one end operating position of the distributing apparatus to an adjoining axial end point of operation of the distributing apparatus. The material may be distributed in any position of the distributing apparatus to a definite level within the range attainable by the rotatable conveyor. The direction of movement of the feed means when carried out according to this embodiment of the invention, which is the preferred embodiment of the invention, may be reversed to change the direction of feed in a manner corresponding to the position of the distributing apparatus.

With the above and other objects and features of my present invention in view, I shall now describe the same on the lines of the accompanying drawings in which:

Fig. 4 is a view illustrating the manner of embodying the invention first mentioned above.

Figure 1:
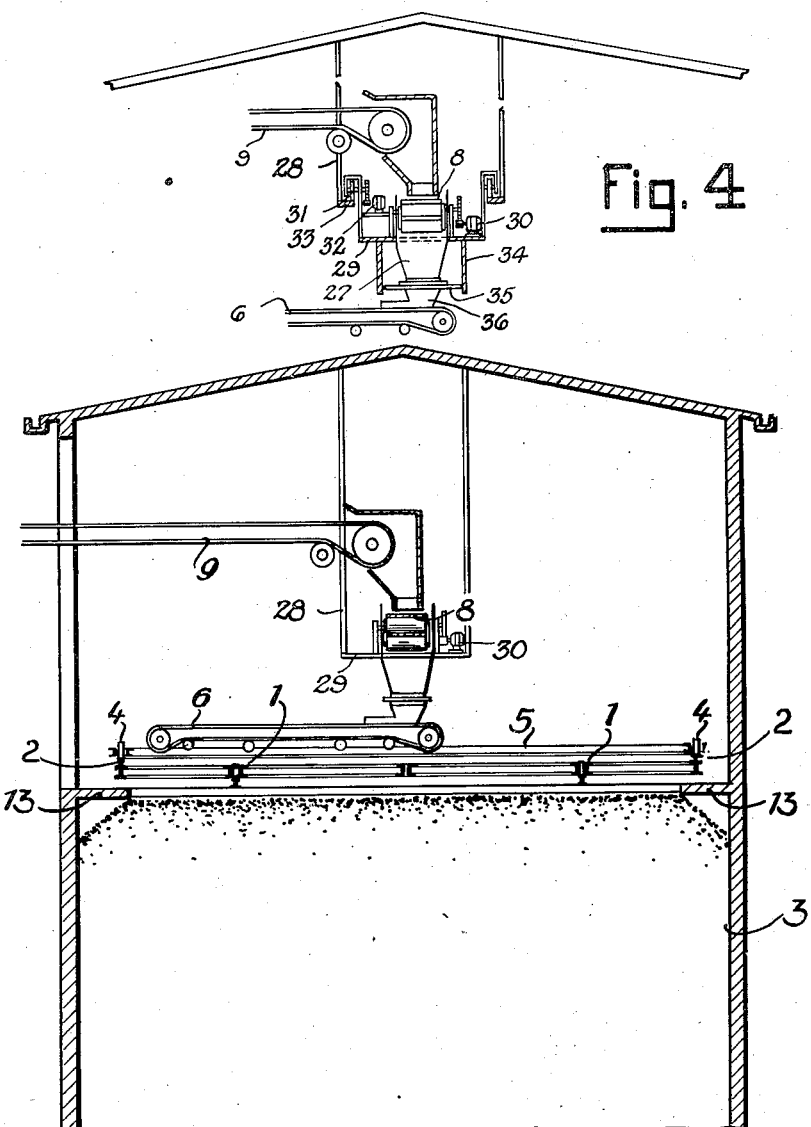
Fig. 1 shows a vertical section through the upper part of the storage bunker and of the distributing apparatus in accordance with the preferred embodiment of the invention.

On a frame 1 formed by horizontal sectional iron there is provided an annular track 2 in the vertical center of the bunker 3 which latter is rectangular in the plan view. A bogie 5 arranged on wheels 4 rotatably travels on the annular track 2. Over the bogie 5 there is provided a discharge belt conveyor 6 which rotates radially outward from the vertical axis 7 of the bogie 5. Arranged to extend laterally of said axis in the longitudinal direction of the storage bunker 3 at about its vertical center is a feeding belt 8 which reaches to one end position for the vertical axis 7 of the bogie 5. The other end of the feeding belt 8 reaches to the point which corresponds approximately to the other end position of the axis of the bogie 5 when the latter is placed in its other end position in the storage bunker 3 shown in dotted lines in Fig. 2. The material to be delivered into the storage bunker 3, for instance coal, is conveyed over a transporting belt 9 to the feeding belt 8 which is made to move in the direction of the arrow 10 and which delivers the coal onto the radially movable belt conveyor 6 rotatably carried by the wheels 4.

Figure 2:
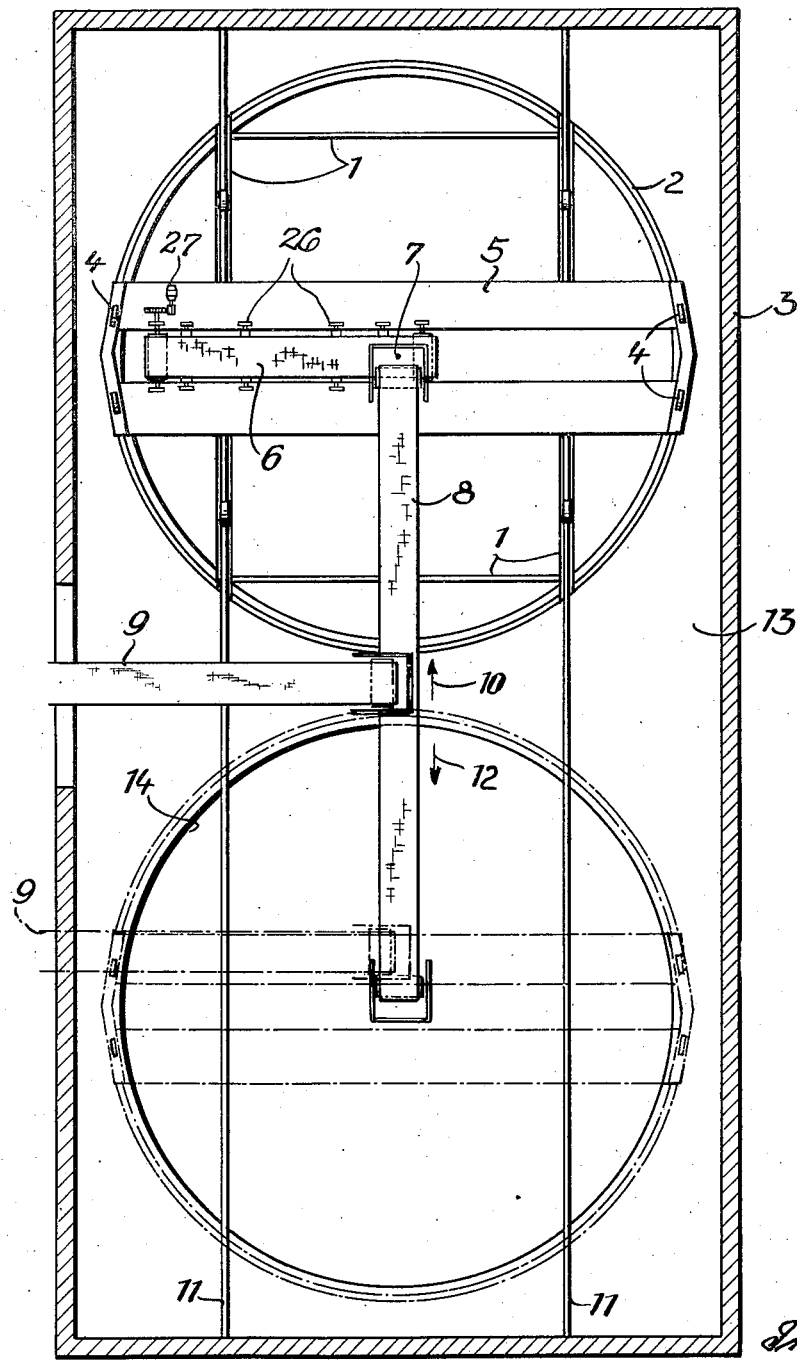
Fig. 2 is a plan view of the distributing apparatus according to Fig. 1.

The conveyor 6 is mounted, as at 26, on the bogie 5 and is driven as by a motor and gears likewise mounted, as at 27, on the bogie 5, Fig. 2.

Conveyor 8 may be mounted on suspension means as stringers 28, and platform 29 and driven by motor and gears as at 30, Fig. 1.

By a slow rotating movement of the bogie 5 and by the radial movement of the belt conveyor 6 there is obtained a uniform distribution of the coal within the bunker 3. The frame 1 carrying the bogie 5 rotatably on the annular track 2 is arranged to travel over the trackway 11 which extends over the whole length of the bunker. When filling in the coal, in accordance with the embodiment of Fig. 4 the whole distributing apparatus may at the same time be moved laterally over the trackway 11 to the other bunker end during the rotating movement of the bogie 5 and the radial movement of the belt conveyor 6. In this way, the coal is distributed over the whole horizontal cross section of the bunker. For such mode of operation of the distributing apparatus, the feeding belt 8 is arranged, as diagrammatically indicated in Fig. 4, to be moved in the longitudinal direction of the bunker 3 and so as to follow at the same time the longitudinal movement of the distributing apparatus. For such purpose platform 29 may be provided with wheels 31 driven, by motor and gearing 32, over rails 33, the platform having an annular member 34 for cooperation with a rotatable element 35 on the spreader 36, detachably connected with the chute 37 and member 34.

Furthermore it is possible to perform the distribution of the coal within the bunker 3 in the preferred manner as shown, for instance in Figs. 1 and 2 of the drawings, so that first of all the coal is uniformly distributed by means of the distributing apparatus 6 up to a certain level. When embodying the invention in a storage bunker 3 in accordance with this preferred design, the distributing device 6 is maintained in the position shown in full lines in Fig. 2 until half the ground area of the bunker is filled to the desired level in this position of the distributing apparatus. The distributing apparatus is then brought into the position over the other half of the horizontal area of the bunker as shown by dot and dash lines in Fig. 2 of the drawings, and from here the uniform filling to the same level is then also effected. In this case the position of the feeding belt 8 is stationary. Only the direction of rotation of the belt 8 is reversed in accordance with the direction of arrow 12. With such mode of operating the apparatus constructed according to this invention, it is advisable to have the conveyor 9, which delivers the coal onto the belt 8, terminate approximately at the middle of the belt 8 over the same. In case the coal is distributed by the distributing apparatus in situ from definite points as in Fig. 2, it is also possible to cover the storage bunker 3 by a lid 13 to such an extent that only the apertures 14 are left free for the purpose of filling in the coal. According to Fig. 2, the storage bunker 3 is of such a size that a filling of the bunker from two end positions of the distributing apparatus is all that is necessary. It is, of course, understood that bunkers of a larger horizontal size also may be operated in the same way as described above, in which case only correspondingly wider feeding belts 8 have to be provided for further distributing positions when using stationarily positioned feeding belts.

Figure 3:
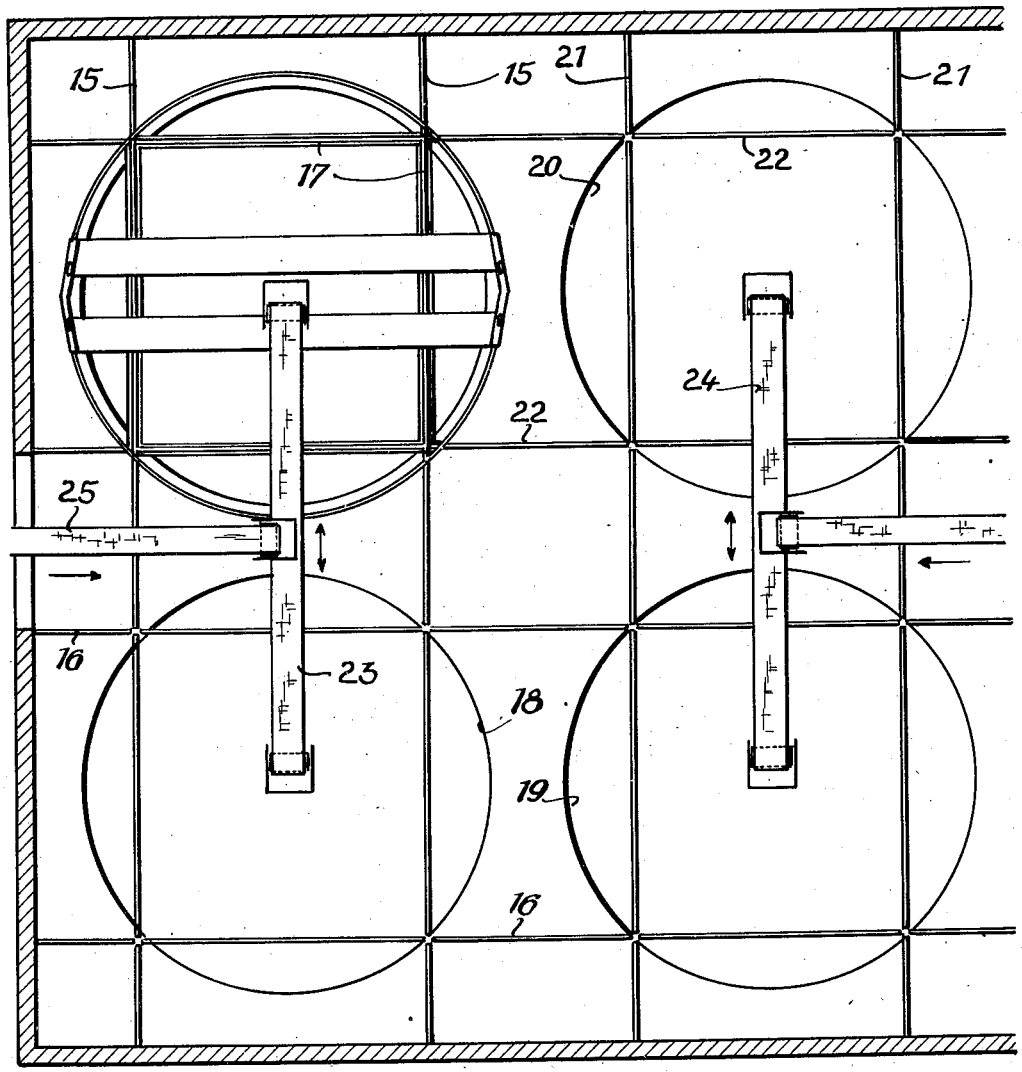
Fig. 3 illustrates another mode of carrying out the preferred embodiment of the present invention.

As may be seen from Fig. 3 it is possible to charge even bunkers of a larger horizontal sectional area in a uniform manner by means of a smaller distributing apparatus built according to the present invention, no angles of slope being formed if the adoption of a larger distributing apparatus extending over the whole bunker proves unsuitable. With such a small distributing apparatus it is assured that the corners of the storage bunker are well filled with coal, even better than is the case with a large distributing apparatus. As shown in Fig. 3, two rows of parallel tracks 15, 21 are provided above the bunker 3, said tracks likewise crossing two rows of the parallel tracks 16, 22. The filling of coal can now take place in the same manner as already mentioned, i. e. the storage bunker is first of all filled with the material within the range of the distributing apparatus 17 to a certain level as illustrated on the drawings. The distributing apparatus 17 is then moved above the aperture 18 across the tracks 15, then moved over the tracks 16 over the roof opening 19, thence moved over the roof opening 20 over the tracks 21. From there, the distributing apparatus 17 may be brought over the tracks 22 back into its first position. The delivery of coal by means of the apparatus according to Fig. 3 takes place over the conveyors 25 which terminate over the middle of the feeding belts 23, 24, by reversing the direction of rotation of the feeding belts 23, 24 over their rollers in the desired way, as already mentioned above.

I have now above described my present invention on the lines of a preferred embodiment thereof, but my invention is not limited in all its aspects to the mode of carrying it out as described and shown, since the invention may be variously embodied within the scope of the following claims.

What I claim is:

1. A charging apparatus for storage bunkers to be charged with lumpy or granular material, said charging apparatus comprising a discharge conveyor arranged above the bunker so as to be rotatable around a vertical axis and also operable during said rotary movement to advance the material for discharge radially of the axis of rotation, said conveyor being mounted on a carriage and said carriage being mounted on way-means therefor for traveling of the carriage horizontally over the bunker area to be filled in direction laterally of the vertical axis of rotation of said carriage, a feed conveyor arranged above said discharge conveyor and operable to feed the material thereto and lying in the vertical plane of the lateral movement of the vertical axis around which the discharge conveyor rotates, and means for charging the material to be treated onto said feed conveyor.

2. A charging apparatus as claimed in claim 1, and in which the feed conveyor which delivers the material onto the discharge conveyor for movement radially of the axis of the rotation is mounted for operation in a stationary position and extends from the end operating position for the vertical axis of rotation of the discharge conveyor at one end of the ways-means in the bunker up to the other end axial point for operation of the discharge conveyor at the other end of the way-means, for distribution of the material at either end position after operation at the opposite end has been effected to a certain level in the hopper, and in which the direction of feed of the feed conveyor is reversible to accommodate feed to the two end operating positions of the discharge conveyor from the stationarily positioned feed conveyor when the conveying direction of the conveyor reverses.

3. Charging apparatus as claimed in claim 1, and in which the way-means comprises two parallel ways crossing two like parallel ways at right angles thereto and interconnected therewith for the lateral movement of the carriage from one end of one of the ways to the other end, thence across one of the right angular ways to the same end of the other way parallel to the initial way, thence back on said way to the end thereof adjacent the starting position, and finally across the other of the right angular ways to the starting position on the initial way.

THEODOR RÜTTEN.